United States Patent
Uekama et al.

(10) Patent No.: US 8,837,941 B2
(45) Date of Patent: Sep. 16, 2014

(54) OPTICAL PACKET SWITCHING SYSTEM AND OPTICAL PACKET SWITCHING DEVICE

(75) Inventors: Kimio Uekama, Kawasaki (JP); Shota Mori, Kawasaki (JP)

(73) Assignee: Fujitsu Telecom Networks Limited, Kawasaki-shi, Kanagawa (JP)

(*) Notice: Subject to any disclaimer, the term of this patent is extended or adjusted under 35 U.S.C. 154(b) by 52 days.

(21) Appl. No.: 13/366,179

(22) Filed: Feb. 3, 2012

(65) Prior Publication Data

US 2012/0201540 A1  Aug. 9, 2012

(30) Foreign Application Priority Data

Feb. 8, 2011 (JP) .................................. 2011-025243

(51) Int. Cl.
- H04J 14/00 (2006.01)
- H04L 12/861 (2013.01)
- H04L 12/851 (2013.01)
- H04J 14/02 (2006.01)
- H04Q 11/00 (2006.01)

(52) U.S. Cl.
CPC ......... *H04L 47/2441* (2013.01); *H04J 14/0212* (2013.01); *H04J 14/0257* (2013.01); *H04Q 2011/0039* (2013.01); *H04J 14/0269* (2013.01); *H04Q 11/0066* (2013.01); *H04Q 2011/0015* (2013.01); *H04L 49/90* (2013.01); *H04Q 11/0005* (2013.01)
USPC .............................................. 398/45; 398/54

(58) Field of Classification Search
CPC .......... H04Q 11/0005; H04Q 11/0066; H04Q 2011/0039
USPC .......................................................... 398/45
See application file for complete search history.

(56) References Cited

U.S. PATENT DOCUMENTS

| 5,469,284 | A | * | 11/1995 | Haas ............................... 398/54 |
| 5,912,753 | A | * | 6/1999 | Cotter et al. .................... 398/54 |
| 6,559,989 | B1 | * | 5/2003 | Kim et al. ...................... 398/101 |
| 6,850,707 | B1 | * | 2/2005 | Chang et al. .................... 398/51 |

(Continued)

FOREIGN PATENT DOCUMENTS

| JP | 2004-236236 A | 8/2004 |
| JP | 2008-211530 A | 9/2008 |
| JP | 2008-235986 | 10/2008 |

OTHER PUBLICATIONS

Japanese Office action with English Machine Translation for Patent Application No. 2011-025243, dated Dec. 3, 2013, 4 pages.

*Primary Examiner* — Ken Vanderpuye
*Assistant Examiner* — Amritbir Sandhu
(74) *Attorney, Agent, or Firm* — Christie, Parker & Hale, LLP

(57) ABSTRACT

An optical packet switching device is provided with: a first input unit and a second input unit for receiving an optical packet signal having destination information and priority information; a first demultiplexer and a second demultiplexer for branching the optical packet signal; an optical switch unit for routing one of branched optical packet signals; a first analyzer unit and a second analyzer unit for analyzing the header of the other branched optical packet signal so as to detect the destination information and the priority information; and an output competition determination unit for checking for temporal competition of a plurality of optical packet signals based on destination information and for determining whether the optical packet signals should be transmitted or discarded based on priority information when there is competition.

5 Claims, 11 Drawing Sheets

(56) References Cited

U.S. PATENT DOCUMENTS

| | | | |
|---|---|---|---|
| 6,934,472 B2* | 8/2005 | Chang et al. | 398/51 |
| 6,957,018 B2* | 10/2005 | Araki et al. | 398/51 |
| 7,881,617 B2* | 2/2011 | Cohen et al. | 398/154 |
| 8,542,996 B2* | 9/2013 | Kawasaki et al. | 398/54 |
| 2002/0109878 A1* | 8/2002 | Qiao | 359/118 |
| 2002/0131120 A1* | 9/2002 | Araki et al. | 359/139 |
| 2005/0047392 A1* | 3/2005 | Ashwood Smith | 370/351 |
| 2006/0018658 A1* | 1/2006 | Mori | 398/79 |
| 2009/0003827 A1* | 1/2009 | Kai et al. | 398/45 |
| 2009/0034970 A1* | 2/2009 | Bogoni et al. | 398/45 |
| 2009/0169205 A1* | 7/2009 | Bergman et al. | 398/45 |
| 2010/0098417 A1* | 4/2010 | Tse-Au | 398/45 |
| 2011/0081149 A1* | 4/2011 | Wada et al. | 398/54 |
| 2012/0128352 A1* | 5/2012 | Kawasaki et al. | 398/45 |
| 2012/0148239 A1* | 6/2012 | Mori et al. | 398/45 |
| 2012/0155862 A1* | 6/2012 | Sato | 398/27 |
| 2012/0155869 A1* | 6/2012 | Sato | 398/45 |
| 2012/0163815 A1* | 6/2012 | Mori et al. | 398/51 |
| 2012/0201537 A1* | 8/2012 | Uekama et al. | 398/51 |
| 2012/0201538 A1* | 8/2012 | Uekama et al. | 398/51 |
| 2012/0223921 A1* | 9/2012 | Ohara | 345/204 |
| 2012/0243869 A1* | 9/2012 | Sato | 398/49 |
| 2012/0251109 A1* | 10/2012 | Mori | 398/51 |
| 2012/0301139 A1* | 11/2012 | Mori | 398/26 |
| 2013/0016967 A1* | 1/2013 | Sato | 398/26 |
| 2013/0039650 A1* | 2/2013 | Sato | 398/26 |
| 2013/0101288 A1* | 4/2013 | Graham et al. | 398/49 |
| 2013/0322879 A1* | 12/2013 | Wachter | 398/45 |

* cited by examiner

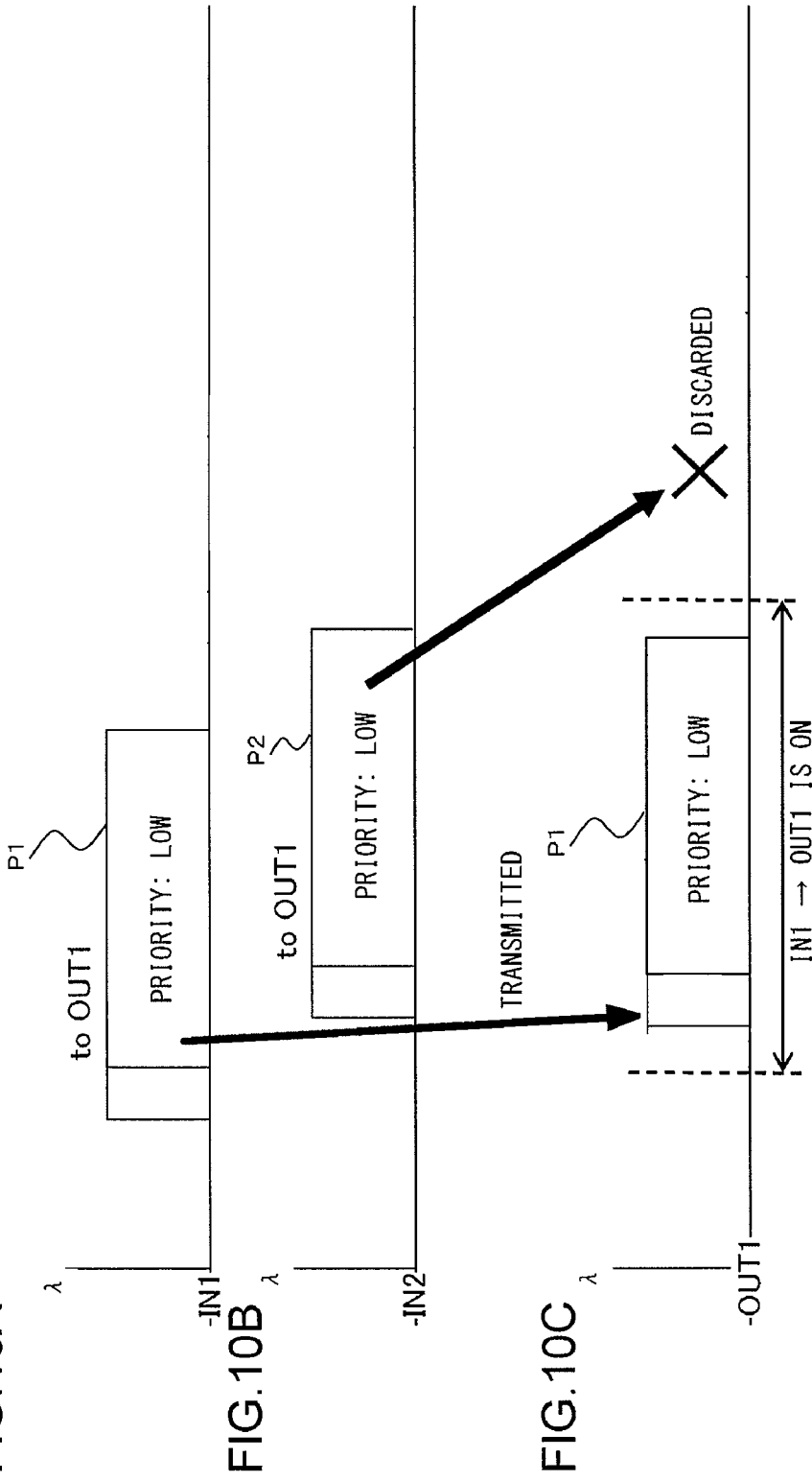

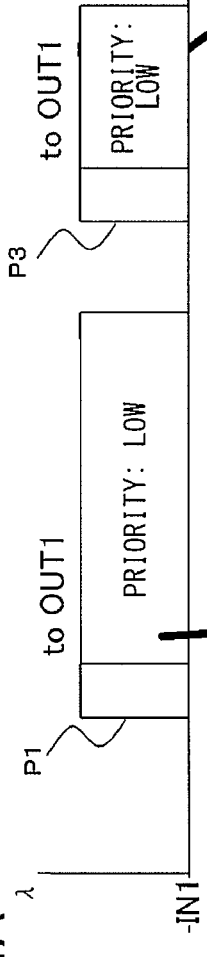
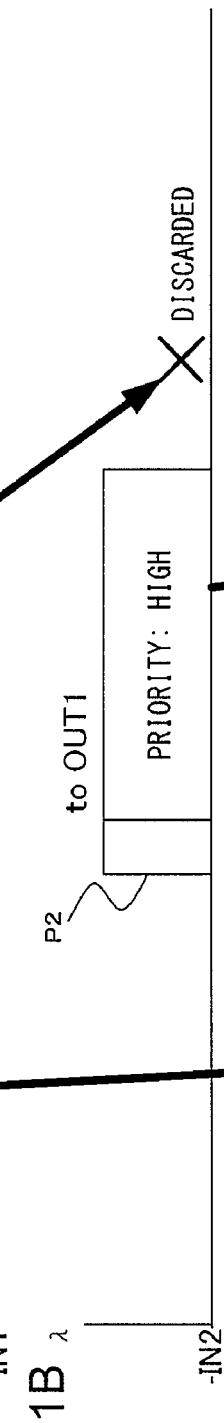
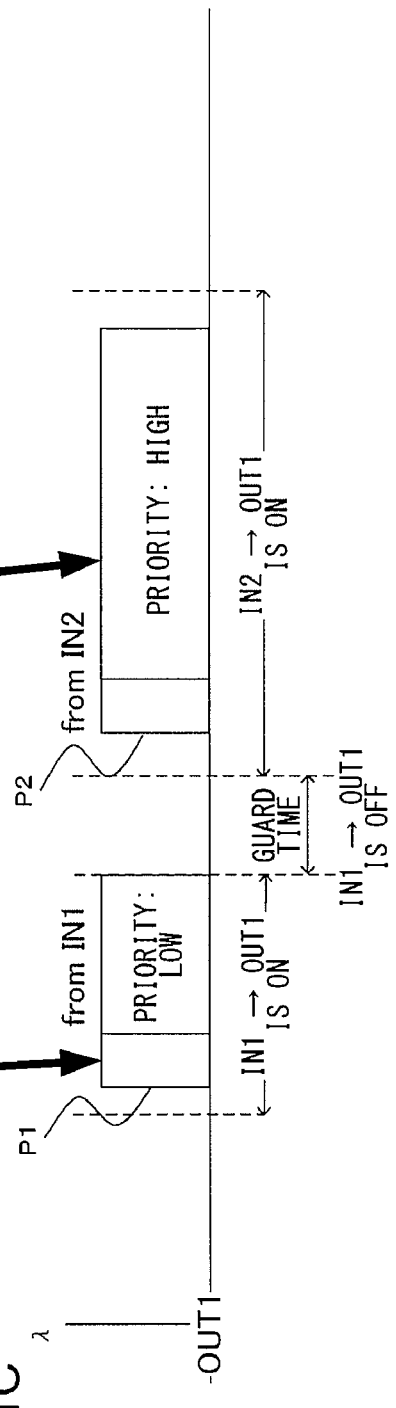
FIG.11A
FIG.11B
FIG.11C

OPTICAL PACKET SWITCHING SYSTEM AND OPTICAL PACKET SWITCHING DEVICE

CROSS-REFERENCE TO RELATED APPLICATION

This application claims priority to and the benefit of Japanese Patent Application Number 2011-025243, filed on Feb. 8, 2011, the entire disclosure of which is incorporated herein by reference.

BACKGROUND OF THE INVENTION

1. Field of the Invention

The present invention relates to an optical packet switching method in which packet-by-packet optical packet switching is enabled by driving an optical switch according to destination information assigned to an optical packet signal.

2. Description of the Related Art

The technology of switching the path depending on the wavelength in an optical transmission system based on wavelength division multiplexing (WDM) and by employing a wavelength selective switch (WSS) is in practical use. One of the next-generation technologies studied is an optical packet switching system in which the path is switched in smaller units, namely, IP packets (10 Gigabit Ethernet (registered trademark) signals, etc.). Each packet is converted in format into an optical packet and routed by using an ultrahigh-speed optical switch (see e.g., patent document No. 1).

When the transmission is based on IP packets, no significant information is transmitted absent any data so that the bandwidth is wasted accordingly. If the optical packet switching system is realized, however, any idle time in which data is absent can be occupied by another packet. Therefore, the optical packet switching system promises the possibility of dramatically increasing the bandwidth usage efficiency of the transmission path and is envisaged as a technology of the future.

[Patent document No. 1] JP 2008-235986

In an optical packet switching device, there are occasions when a plurality of optical packet signals received at the same time by a plurality of input units request output to a same output unit. In such a case, the optical packet switching device performs switching using an optical packet signal received first as a valid optical packet signal and discards the following optical packet.

However, the degree of priority for transmission may be set for a client signal such as, e.g., an Ether signal according to the type of data. In this situation, it is preferred to efficiently transmit a client signal with a high degree of priority.

SUMMARY OF THE INVENTION

The present invention addresses the background as described above, and a purpose thereof is to provide a technology capable of efficiently transmitting a client signal with a high degree of priority in an optical packet switching system.

An optical packet switching system according to one embodiment of the present invention comprises: an optical packet transmitter device including a detection unit configured to detect destination information and predetermined priority information from a received client signal, a header generation unit configured to generate a header containing the destination information and the priority information, a header insertion unit configured to insert the header in the client signal so as to generate a packet signal, and an electrical/optical converter unit configured to convert the packet signal into an optical packet signal; and an optical packet switching device including a plurality of receiver units configured to receive an optical packet signal, a branching unit configured to branch the optical packet signal, an optical switch unit configured to route one of branched optical packet signals, an analyzer unit configured to analyze the header of the other branched optical packet signal so as to detect the destination information and the priority information, and an output competition determination unit configured to check for temporal competition of a plurality of optical packet signals input to the plurality of receiver units based on destination information and to determine whether the optical packet signals should be transmitted or discarded based on priority information when there is competition.

The output competition determination unit may compare the degree of priority of competing optical packet signals when there is temporal competition in the plurality of optical packet signals and allow an optical packet signal input first to pass and discards the following optical packet when the optical packet signals have equal degree of priority.

The output competition determination unit may compare the degree of priority of competing optical packet signals when there is temporal competition in the plurality of optical packet signals and allow an optical packet signal having a high degree of priority to pass and discards an optical packet having a low degree of priority when the optical packet signals have different degree of priority.

When a second optical packet signal whose degree of priority is higher than that of a given first optical packet signal is input while the first optical packet signal is being transmitted, the output competition determination unit may stop the transmission of the first optical packet signal and allow the second optical packet signal to pass.

The optical packet switching system may further comprise: an optical packet receiver device configured to receive an optical signal output from the optical packet switching device. When the optical packet receiver device receives the optical packet signal stopped in the middle by the output competition determination unit from being transmitted, the optical receiver device may discard the optical packet signal.

Another embodiment of the present invention relates to an optical packet switching device. The optical packet switching device comprises: a plurality of receiver units configured to receive an optical packet signal having a header containing destination information and priority information; a branching unit configured to branch the optical packet signal; an optical switch unit configured to route one of branched optical packet signals; an analyzer unit configured to analyze the header of the other branched optical packet signal so as to detect the destination information and the priority information; and an output competition determination unit configured to check for temporal competition of a plurality of optical packet signals input to the plurality of receiver units based on destination information and to determine whether the optical packet signals should be transmitted or discarded based on priority information when there is competition.

Optional combinations of the aforementioned constituent elements, or implementations of the invention in the form of apparatuses, methods, systems, programs, and recording mediums storing programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIGS. 10A-10C illustrate output competition determination in the optical packet switching device according to the present embodiment; and FIGS. 11A-11C illustrate output competition determination in the optical packet switching device according to the present embodiment.

DETAILED DESCRIPTION OF THE INVENTION

The invention will now be described by reference to the preferred embodiments. This does not intend to limit the scope of the present invention, but to exemplify the invention.

A description will now be given of an optical packet switching system according to an embodiment of the present invention. Prior to an explanation of the optical packet switching system according to the embodiment of the present invention, an explanation is given as a comparative example regarding an optical packet switching system conventionally developed by the present inventors.

Figure 1:
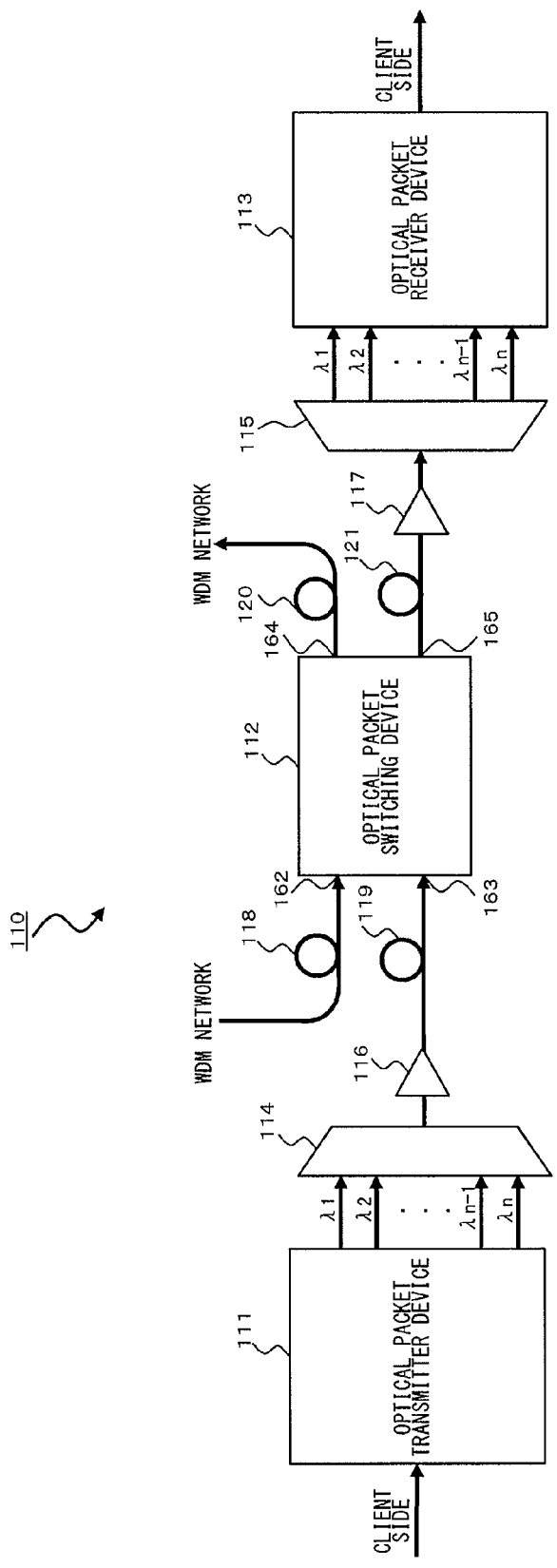
FIG. 1 shows an optical packet switching system according to a comparative example.

FIG. 1 shows an optical packet switching system 110 according to the comparative example. As shown in FIG. 1, the optical packet switching system 110 comprises an optical packet transmitter device 111, an optical packet switching device 112, an optical packet receiver device 113, a first AWG 114, a second AWG 115, a first optical amplifier 116, a second optical amplifier 117, and first through fourth optical transmission paths 118-121.

The optical packet transmitter device 111 generates a routing information header (including a packet length, destination information, and a local node ID) that indicates a forwarding destination of a 10 Gigabit Ethernet packet received from a client, adds the routing information header to the head of the packet, and then divides the data of the packet by n. The optical packet transmitter device 111 then adds the divided n pieces of data to optical signals at wavelengths λ1-λn and outputs the optical signals as optical packet signals of n wavelengths. Regardless of the packet length of an Ether signal, the number by which an Ether packet is divided is fixed to n (the maximum number of wavelengths that can be used in a system, e.g., n=40).

The optical packet signals of n wavelengths (at wavelengths λ1-λn) output from the optical packet transmitter device 111 are multiplexed by the first AWG 114, then amplified by the first optical amplifier 116, and output to the second optical transmission path 119.

The optical packet signal propagated through the second optical transmission path 119 is input to a second input unit 163 of the optical packet switching device 112. To a first input unit 162 of the optical packet switching device 112, a wavelength-multiplexed optical packet signal from another optical packet transmitter device connected to a WDM network is input via the first optical transmission path 118.

The optical packet switching device 112 is a 2-input×2-output optical packet switching device that switches a route of an optical packet signal in accordance with destination information assigned to the optical packet signal. The third optical transmission path 120 is connected to the first output unit 164 of the optical packet switching device 112, and the fourth optical transmission path 121 is connected to the second output unit 165. The optical packet signal propagated through the third optical transmission path 120 is output to the WDM network. Meanwhile, the optical packet signal propagated through the fourth optical transmission path 121 is amplified by the second optical amplifier 117 and then demultiplexed into wavelengths of λ1-λn by the second AWG 115. The optical packet signals of n wavelengths demultiplexed by the second AWG 115 are input to the optical packet receiver device 113.

The optical packet receiver device 113 restores the received optical packet signals of n wavelengths to the original Ether packet and outputs the restored Ether packet to the client.

Figure 2:
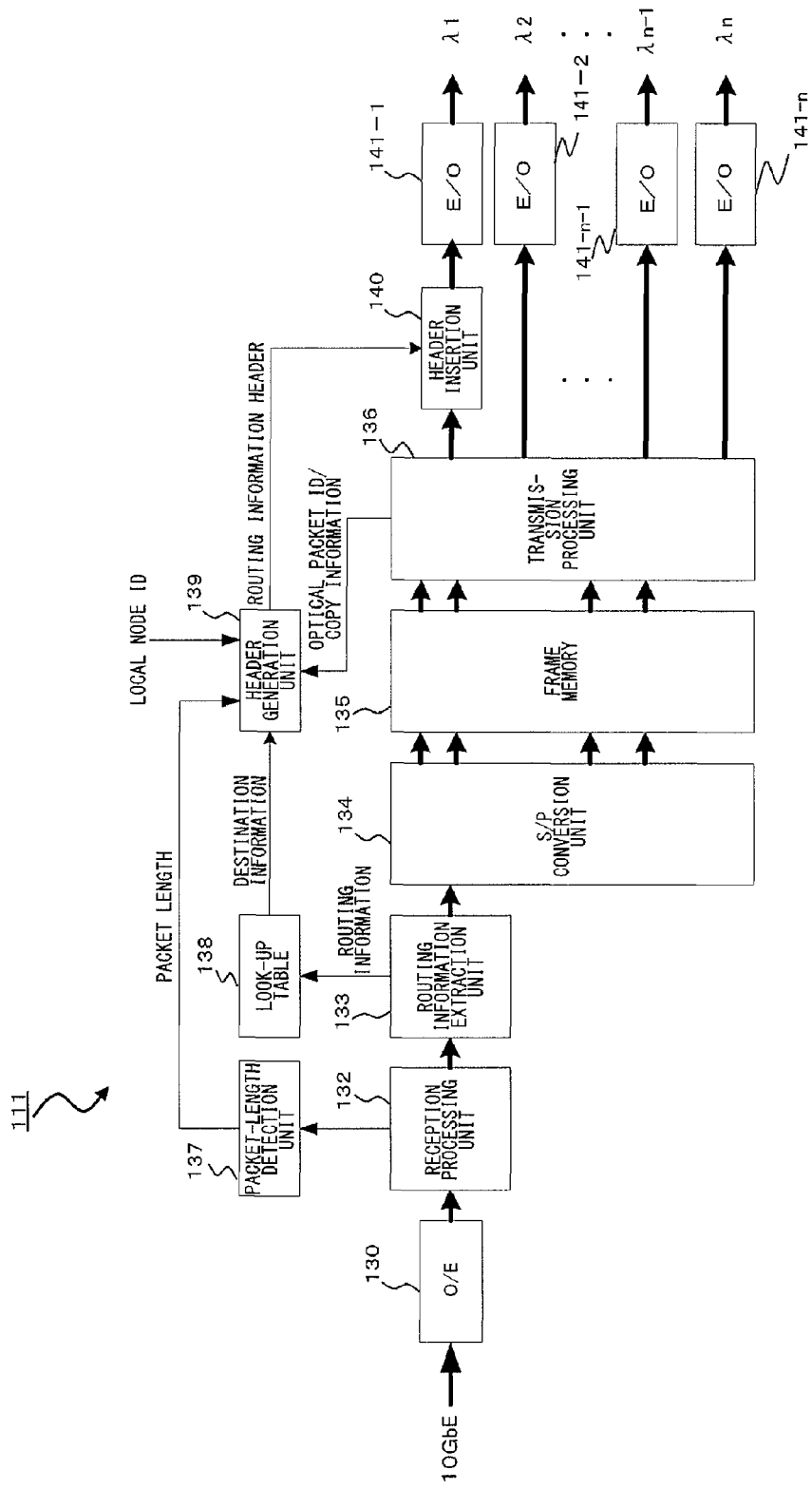
FIG. 2 shows the configuration of an optical packet transmitter device according to the comparative example.

FIG. 2 shows the configuration of the optical packet transmitter device 111 according to the comparative example. As shown in FIG. 2, the optical packet transmitter device 111 comprises an optical/electrical converter unit 130, a reception processing unit 132, a routing information extraction unit 133, a serial/parallel conversion unit 134, a frame memory 135, a transmission processing unit 136, a packet-length detection unit 137, a look-up table 138, a header generation unit 139, a header insertion unit 140, and first through nth electrical/optical converter units 141-1 through 141-n.

In the optical packet transmitter device 111, a 10 Gigabit Ethernet signal input from the client is converted into an electrical signal by the optical/electrical converter unit 130. The data format of this electrical Ether signal is a MAC frame. A predetermined reception process is then performed on the Ether signal in the reception processing unit 132. The routing information extraction unit 133 then extracts routing information from the Ether signal. The routing information is converted into destination information by referring to the look-up table 138 and then input to the header generation unit 139. The packet-length detection unit 137 extracts the packet length of the received Ether signal and then outputs the extracted packet length to the header generation unit 139.

The Ether signal output from the routing information extraction unit 133 is converted into a parallel signal by the serial/parallel conversion unit 134 and then stored in the frame memory 135. The Ether signal is then equally divided by n by the transmission processing unit 136 so as to generate n pieces of packet signals. Optical packet ID/copy information is output from the transmission processing unit 136 to the header generation unit 139.

The header generation unit 139 generates a routing information header based on the packet length, the destination information, the local node ID, and the optical packet ID/copy information. The generated routing information header is inserted in one packet signal among the n pieces of packet signals divided by the header insertion unit 140. The n pieces of packet signals are then converted into optical signals by the first through nth electrical/optical converter units 141-1 through 141-n and then output as optical packet signals of n wavelengths (λ1-λn). The wavelength of an optical packet signal in which the routing information header is inserted is referred to as a "header wavelength." The header wavelength is λ1 in this case.

Figure 3:
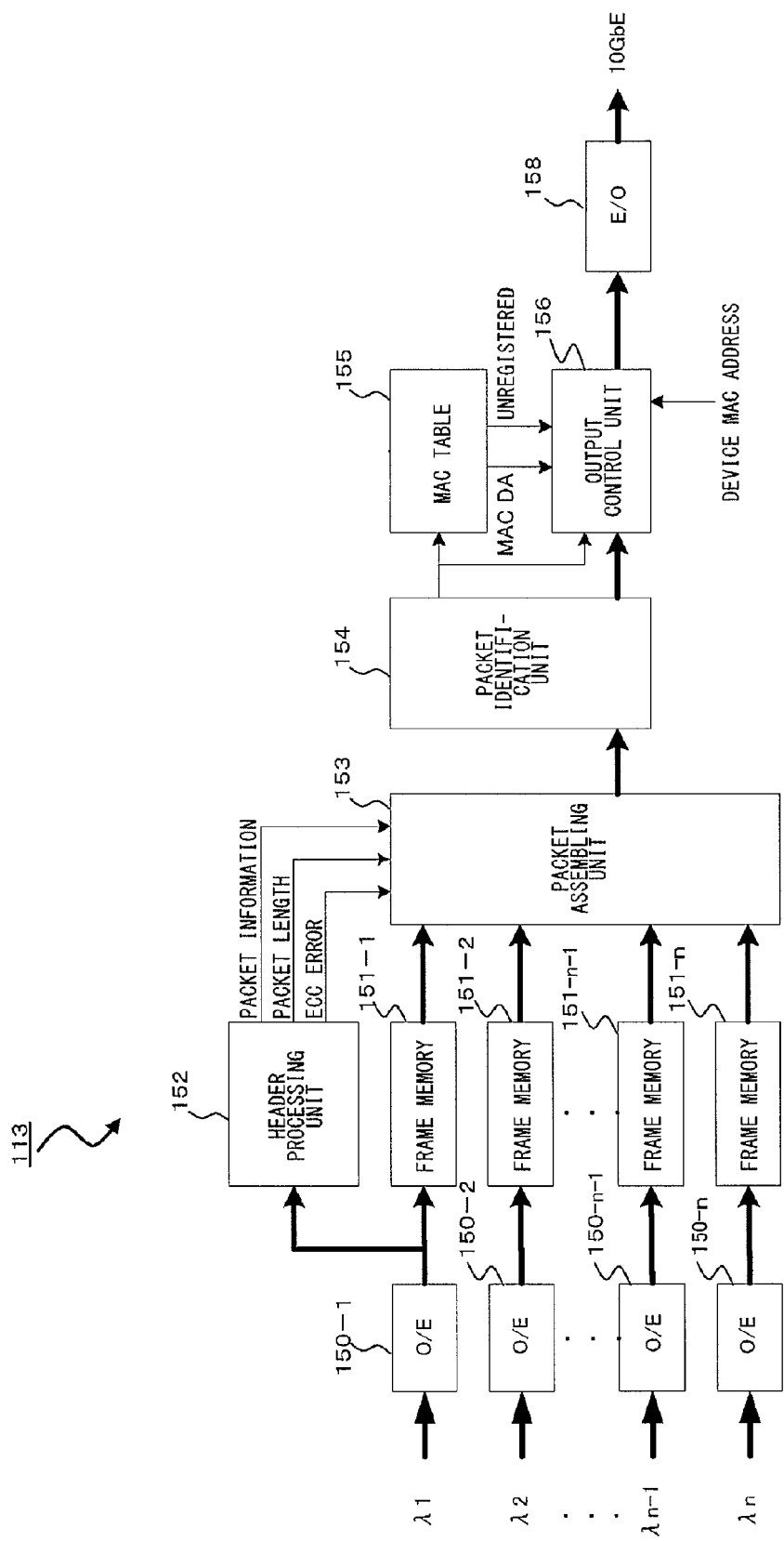
FIG. 3 shows the configuration of an optical packet receiver device according to the comparative example.

FIG. 3 shows the configuration of an optical packet receiver device 113 according to the comparative example. As shown in FIG. 3, the optical packet receiver device 113 comprises a first through nth optical/electrical converter units 150-1 through 150-n, first through nth frame memories 151-1 through 151-n, a header processing unit 152, a packet assembling unit 153, a packet identification unit 154, a MAC table 155, an output control unit 156, and an electrical/optical converter unit 158.

In the optical packet receiver device 113, the optical packet signals of n wavelengths (λ1-λn) that have been input are converted into electrical packet signals by the first through nth optical/electrical converter units 150-1 through 150-n, respectively. The header processing unit 152 extracts packet information, a packet length, and an ECC (Error Check Code) error from the routing information header of a packet signal that corresponds to the optical packet signal of the header wavelength of λ1 so as to determine the normality of the packet signal.

The n pieces of packet signals output from the first through nth optical/electrical converter units 150-1 through 150-n are stored in the first through nth frame memories 151-1 through 151-n, respectively. The packet assembling unit 153 assembles a packet in reference to the packet information, the packet length, and the ECC error from the header processing unit 152. The packet identification unit 154 identifies an Ether packet from the output of the packet assembling unit 153 and extracts the Ether packet. In reference to the MAC table 155, the output control unit 156 replaces a destination MAC address in the Ether packet output from the packet identification unit 154 with a MAC address registered in the MAC table 155. The Ether packet is then input to the electrical/optical converter unit 158. The data format of an Ether signal input to the electrical/optical converter unit 158 is a MAC frame. The electrical/optical converter unit 158 converts the Ether packet into an optical signal and then output the optical signal to the client.

Figure 4:
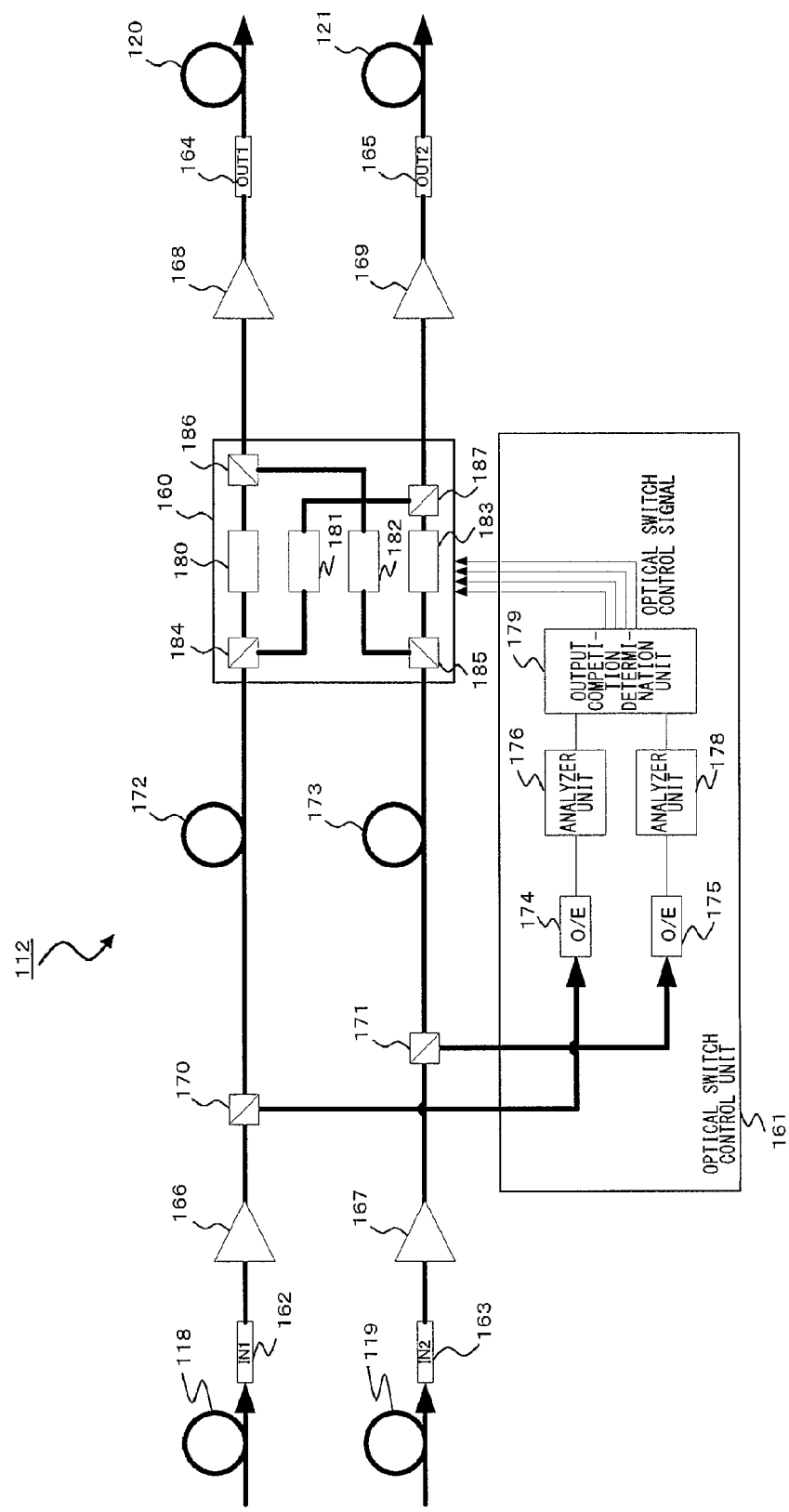
FIG. 4 shows the configuration of an optical packet switching device according to the comparative example.

FIG. 4 shows the configuration of an optical packet switching device 112 according to the comparative example. As shown in FIG. 4, the optical packet switching device 112 comprises an optical switch unit 160, an optical switch control unit 161, a first input unit 162, a second input unit 163, a first input-side optical amplifier 166, a second input-side optical amplifier 167, a first demultiplexer 170, a second demultiplexer 171, a first optical delay line 172, a second optical delay line 173, a first output-side optical amplifier 168, a second output-side optical amplifier 169, a first output unit 164, and a second output unit 165. The optical switch control unit 161 comprises a first optical/electrical converter unit 174, a second optical/electrical converter unit 175, a first analyzer unit 176, a second analyzer unit 178, and an output competition determination unit 179.

The optical packet switching device 112 extracts the routing information header from an optical packet signal that has been input as a WDM signal from the client or the network. The optical packet switching device 112 then determines an output destination based on the routing information header and switches the output destination by the optical switch unit 160.

Wavelength-multiplexed optical packet signals of n wavelengths are input to the first input unit 162 and the second input unit 163. The optical packet signals that are input are obtained by converting an Ether signal from a client unit of the local node or a client unit of another node in an optical packet transmitter device such as the one shown in FIG. 2.

The optical packet signals that have been input are amplified by the first input-side optical amplifier 166 and second input-side optical amplifier 167 for optical level adjustment. Then, only optical packet signals of header wavelengths are optically branched by the first demultiplexer 170 and the second demultiplexer 171. The branched optical packet signals of header wavelengths are input to the optical switch control unit 161. Meanwhile, wavelength-multiplexed optical packet signals are input to the optical switch unit 160 via the first optical delay line 172 and the second optical delay line 173.

The branched optical packet signals of the header wavelengths are converted into electrical packet signals by the first optical/electrical converter unit 174 and the second optical/electrical converter unit 175, respectively. Then, routing information headers thereof are analyzed by the first analyzer unit 176 and the second analyzer unit 178 so as to detect destination information.

The output competition determination unit 179 determines whether the optical packet signals should be transmitted or discarded based on the detected destination information and outputs an optical switch control signal to the optical switch unit 160 based on the result of determination.

The first optical delay line 172 and the second optical delay line 173 delay the wavelength-multiplexed optical packet signals for a duration required for the optical switch control unit 161 to generate the optical switch control signal. By providing the first optical delay line 172 and the second optical delay line 173, on/off of the optical switch unit 160 can be controlled to be synchronized with the timing of arrival of the optical packet signals at the optical switch unit 160.

The optical switch unit 160 is a 2×2 optical switch and comprises first through fourth optical gate switches 180 through 183 and four optical couplers 184-187. The optical gate switches may be implemented by a semiconductor optical amplifier (SOA). The first through fourth optical gate switches 180 through 183 are controlled to be turned on or off by an optical switch control signal from the optical switch control unit 161. In the optical packet switching device 112, the wavelength-multiplexed optical packet signals of n wavelengths are routed all at once based on the destination information extracted from an optical packet signal of one header wavelength.

FIGS. 5A-5C illustrate output competition determination in the optical packet switching device 112. FIG. 5A shows an optical packet signal input to the first input unit 162. FIG. 5B shows an optical packet signal input to the second input unit 163. FIG. 5C shows an optical packet signal output from the first output unit 164. Optical packet signals 1-1, 1-2, and 2-1 that have been input are all directed to the first output unit 164 as an output destination.

Figure 5:
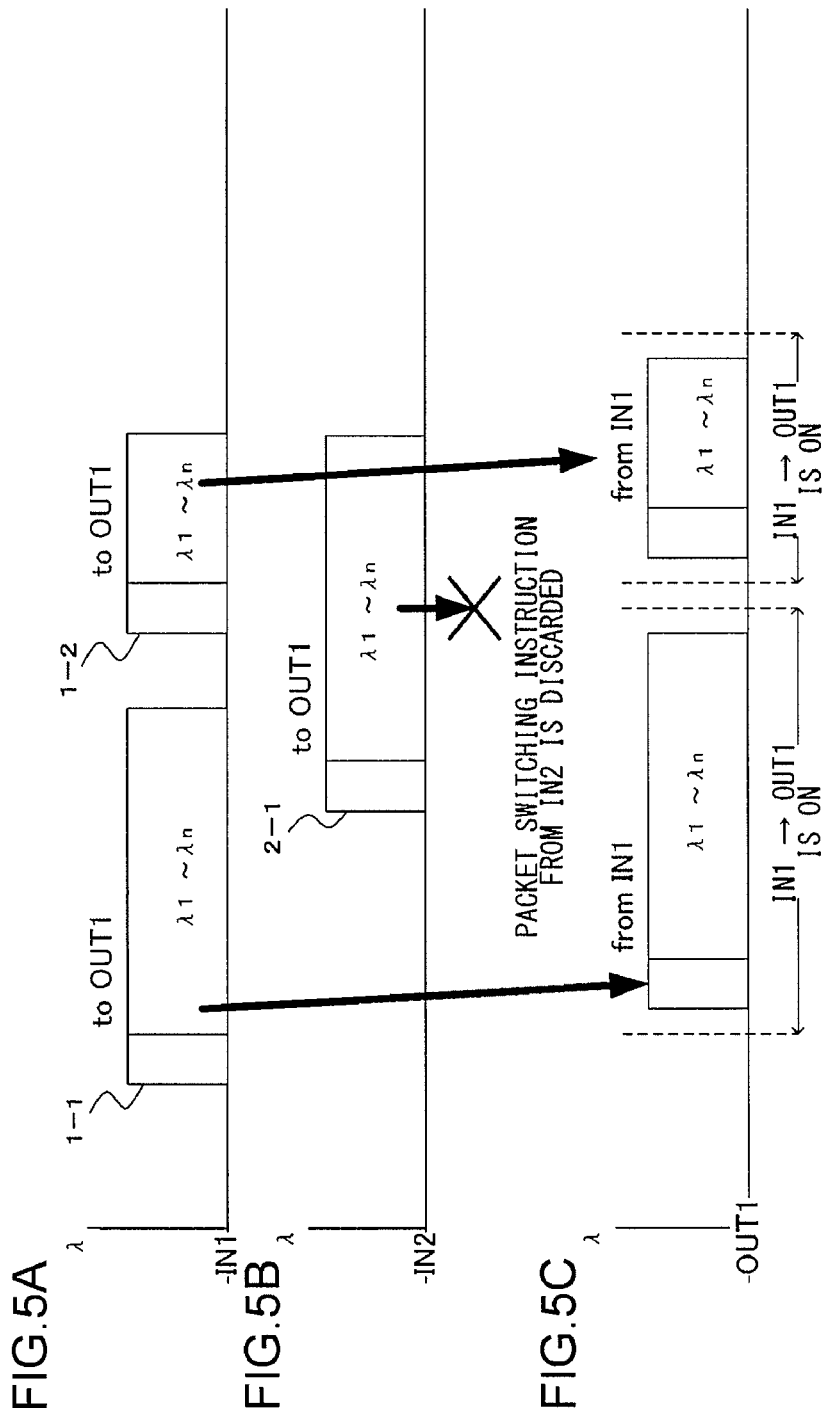
FIGS. 5A-5C illustrate output competition determination in the optical packet switching device according to the comparative example.

As shown in FIG. 5, the optical packet signal 1-1 is first input to the first input unit 162, the optical packet signal 2-1 is then input to the second input unit 163, and the optical packet signal 1-2 is lastly input to the first input unit 162. Since the optical packet signal 1-1 is a signal that arrives first, the output competition determination unit 179 outputs the optical packet signal 1-1 to the first output unit 164. In other words, the output competition determination unit 179 turns on the optical gate switch 180 of the optical switch unit 160 and opens a path from the first input unit 162 to the first output unit 164.

However, the optical packet signal 2-1 input to the second input unit 163 temporally competes with the optical packet signal 1-1 input to the first input unit 162. In other words, the two optical packet signals concur in time. In this case, the output competition determination unit 179 discards the optical packet signal 2-1. In other words, the output competition determination unit 179 leaves off the optical gate switches 182 and 183 to which the optical packet signal 2-1 is input.

Although the optical packet signal 1-2 input to the first input unit 162 has an overlapping data portion with the optical packet signal 2-1, the output competition determination unit 179 outputs the optical packet signal 1-2 to the first output unit 164 since the optical packet signal 2-1 is already discarded.

As described, if congestion occurs in some optical packet signals when optical packet signals are received at the same timing from a plurality of input units with output requests for a same output route in the optical packet switching device according to the comparative example, a process is performed where an optical packet signal received first is allowed to pass and where the following optical packet signal is discarded.

Meanwhile, the degree of priority for transmission may be set for a client signal such as, e.g., an Ether signal according to the type (emails, phones, video images, etc.) of data. In this situation, it is preferred to perform routing in consideration of the degree of priority of the client signal. A description will now be given of an optical packet switching system capable of performing routing according to the degree of priority of a client signal.

Figure 6:
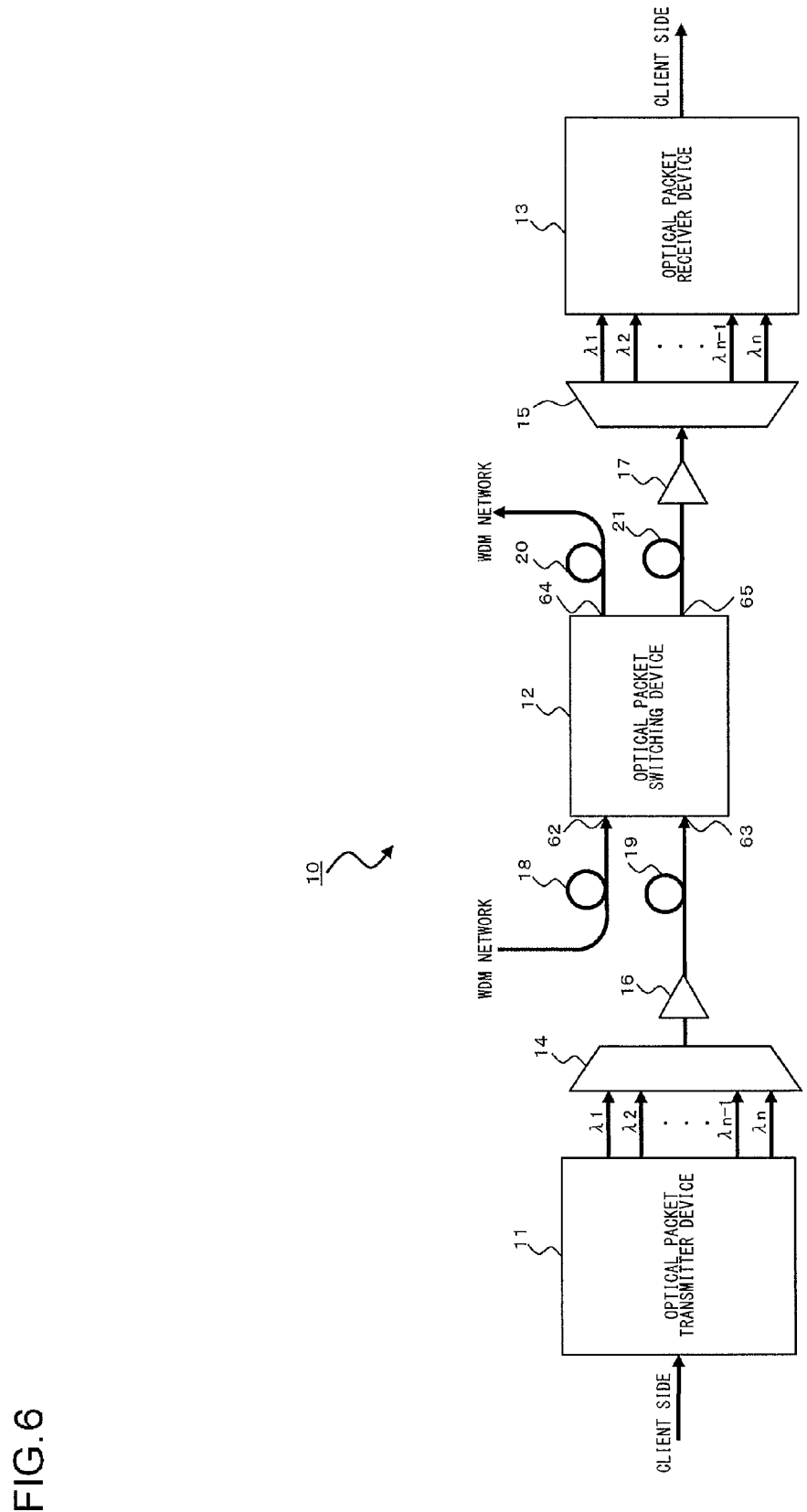
FIG. 6 shows an optical packet switching system according to the embodiment of the present invention.

FIG. 6 shows an optical packet switching system 10 according to the embodiment of the present invention. As shown in FIG. 6, the optical packet switching system 10 comprises an optical packet transmitter device 11, an optical packet switching device 12, an optical packet receiver device 13, a first AWG 14, a second AWG 15, a first optical amplifier 16, a second optical amplifier 17, and first through fourth optical transmission paths 18-21. The basic configuration of the optical packet switching system 10 is similar to that of the optical packet switching system 110 shown in FIG. 1. Thus, a detailed description is omitted.

Figure 7:
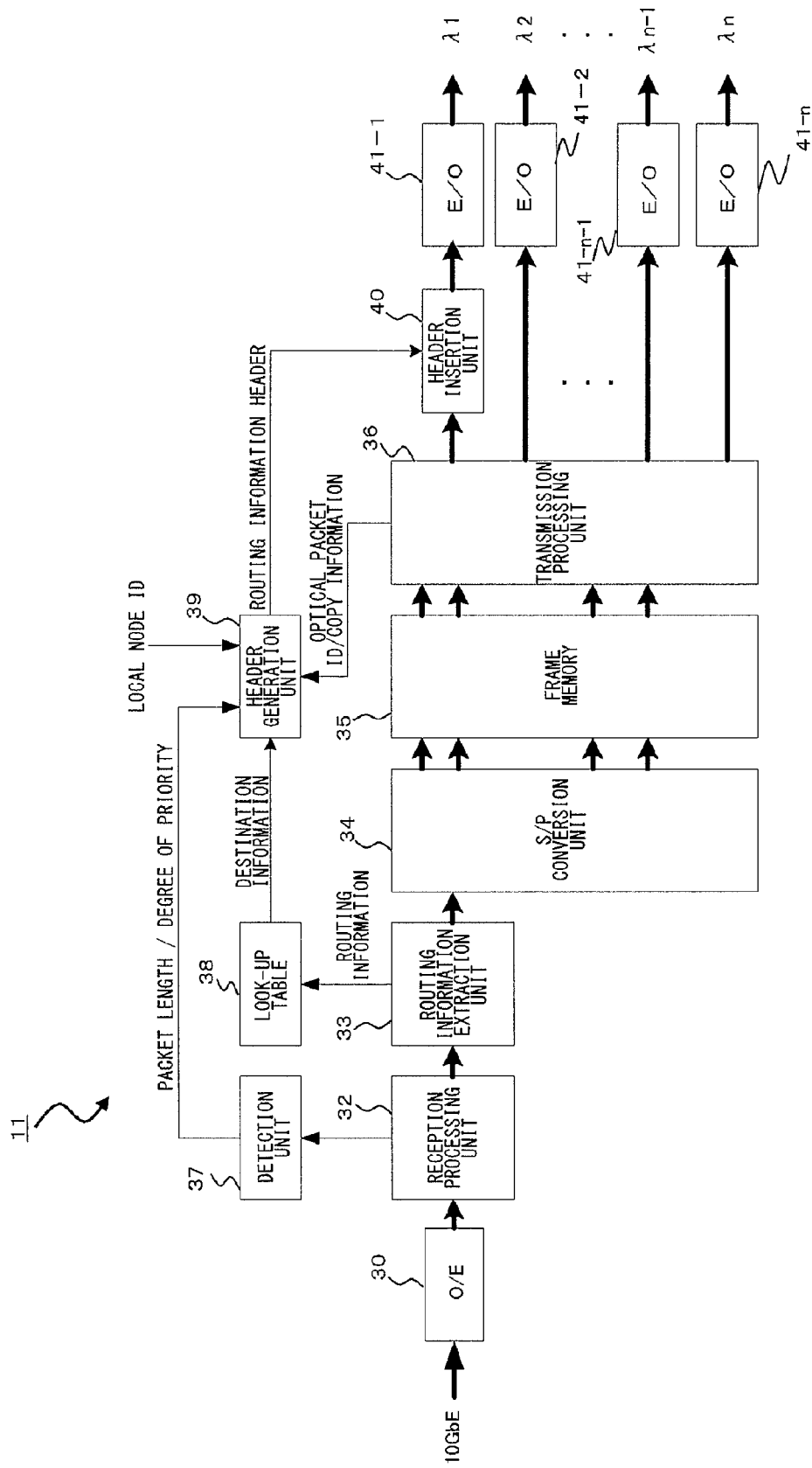
FIG. 7 shows the configuration of an optical packet transmitter device according to the present embodiment.

FIG. 7 shows the configuration of the optical packet transmitter device 11 according to the embodiment. As shown in FIG. 7, the optical packet transmitter device 11 comprises an optical/electrical converter unit 30, a reception processing unit 32, a routing information extraction unit 33, a serial/parallel conversion unit 34, a frame memory 35, a transmission processing unit 36, a detection unit 37, a look-up table 38, a header generation unit 39, a header insertion unit 40, and first through nth electrical/optical converter units 41-1 through 41-n. The optical packet transmitter device 11 functions as an Ether signal/optical packet converter device.

A 10 Gigabit Ethernet signal is input to the optical packet transmitter device 11 from the client. Priority information determined by the client managing data according to the type of the data is included in the Ether signal. The priority information represents the degree of importance of the Ether signal, and an Ether signal with a high degree of propriety is transmitted preferentially over a signal with a low degree of priority. An example of data with a high degree of priority includes, for example, data for Video On Demand that continuously transmits large volumes of video data.

The 10 Gigabit Ethernet signal input from the client is converted into an electrical signal by the optical/electrical converter unit 30. The data format of this electrical Ether signal is a MAC frame. A predetermined reception process is then performed on the Ether signal in the reception processing unit 32. The routing information extraction unit 33 then extracts routing information from the Ether signal. The routing information is converted into destination information by referring to the look-up table 38 and then input to the header generation unit 39. The detection unit 37 detects packet length information and priority information in the received Ether signal and then outputs the detected packet length information and priority information to the header generation unit 39.

The Ether signal output from the routing information extraction unit 33 is converted into a parallel signal by the serial/parallel conversion unit 134 and then stored in the frame memory 35. The Ether signal is then equally divided by n by the transmission processing unit 36 so as to generate n pieces of packet signals. Optical packet ID/copy information is output from the transmission processing unit 36 to the header generation unit 39.

The header generation unit 39 generates a routing information header based on the packet length, the destination information, the priority information, the local node ID, and the optical packet ID/copy information. The generated routing information header is inserted in one packet signal among the n pieces of packet signals divided by the header insertion unit 40. The n pieces of packet signals are then converted into optical signals by the first through nth electrical/optical converter units 41-1 through 41-n and then output as optical packet signals of n wavelengths ($\lambda 1$-$\lambda n$). The wavelength of an optical packet signal in which the routing information header is inserted is referred to as a "header wavelength." The header wavelength is $\lambda 1$ in this case.

Figure 8:
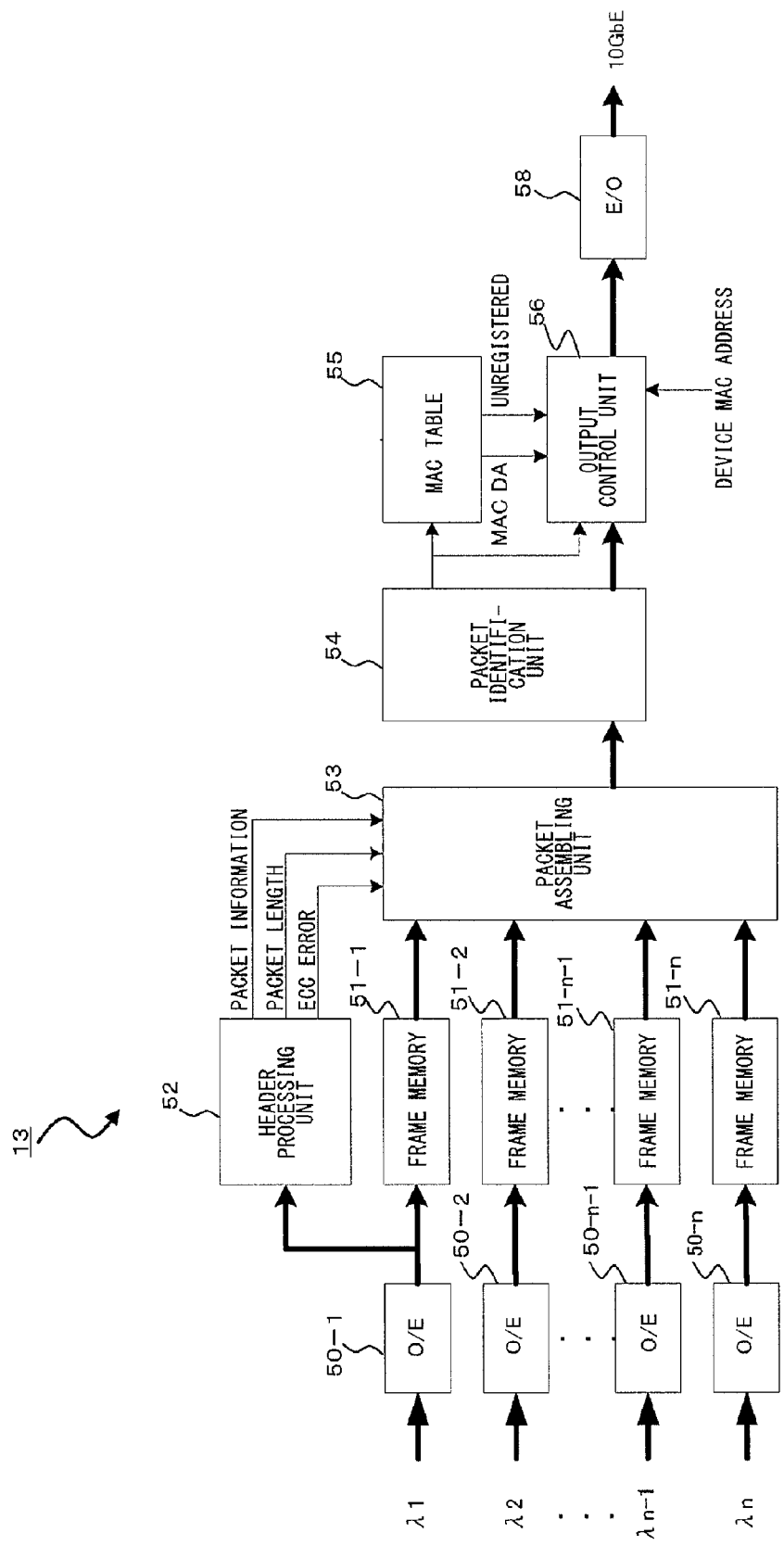
FIG. 8 shows the configuration of an optical packet receiver device according to the present embodiment.

FIG. 8 shows the configuration of the optical packet receiver device 13 according to the embodiment. As shown in FIG. 8, the optical packet receiver device 13 comprises a first through nth optical/electrical converter units 50-1 through 50-n, first through nth frame memories 51-1 through 51-n, a header processing unit 52, a packet assembling unit 53, a packet identification unit 54, a MAC table 55, an output control unit 56, and an electrical/optical converter unit 58. The optical packet receiver device 13 functions as an optical packet/Ether signal converter device.

In the optical packet receiver device 13, the optical packet signals of n wavelengths ($\lambda 1$-$\lambda n$) that have been input are converted into electrical packet signals by the first through nth optical/electrical converter units 50-1 through 50-n, respectively.

The header processing unit 52 extracts a wavelength in use, packet information, a packet length, and an ECC (Error Check Code) error from the routing information header of a packet signal converted from an optical packet signal of a header wavelength of $\lambda 1$ and transmits these to the packet assembling unit 53.

The n pieces of packet signals output from the first through nth optical/electrical converter units 50-1 through 50-n are stored in the first through nth frame memories 51-1 through 51-n, respectively. The packet assembling unit 53 assembles a packet in reference to the packet information, the packet length, and the ECC error from the header processing unit 52.

The packet identification unit 54 identifies an Ether packet from the output of the packet assembling unit 53 and extracts the Ether packet. The packet identification unit 54 performs packet anomaly detection by reading a FCS (Frame Check Sequence), which is a CRC (Cyclic Redundancy Check) value calculated from the respective fields of a destination address, transmission source address, length/type, and data of the Ether signal, and by making comparison with a CRC value calculated in a local station. In the case of anomaly, the packet identification unit 54 discards the data.

In reference to the MAC table 55, the output control unit 56 replaces a destination MAC address in the Ether packet output from the packet identification unit 54 with a MAC address registered in the MAC table 55. The Ether packet is then input to the electrical/optical converter unit 58. The data format of the Ether signal input to the electrical/optical converter unit 58 is a MAC frame. The electrical/optical converter unit 58 converts the Ether packet into an optical signal and then output the optical signal to the client.

Figure 9:
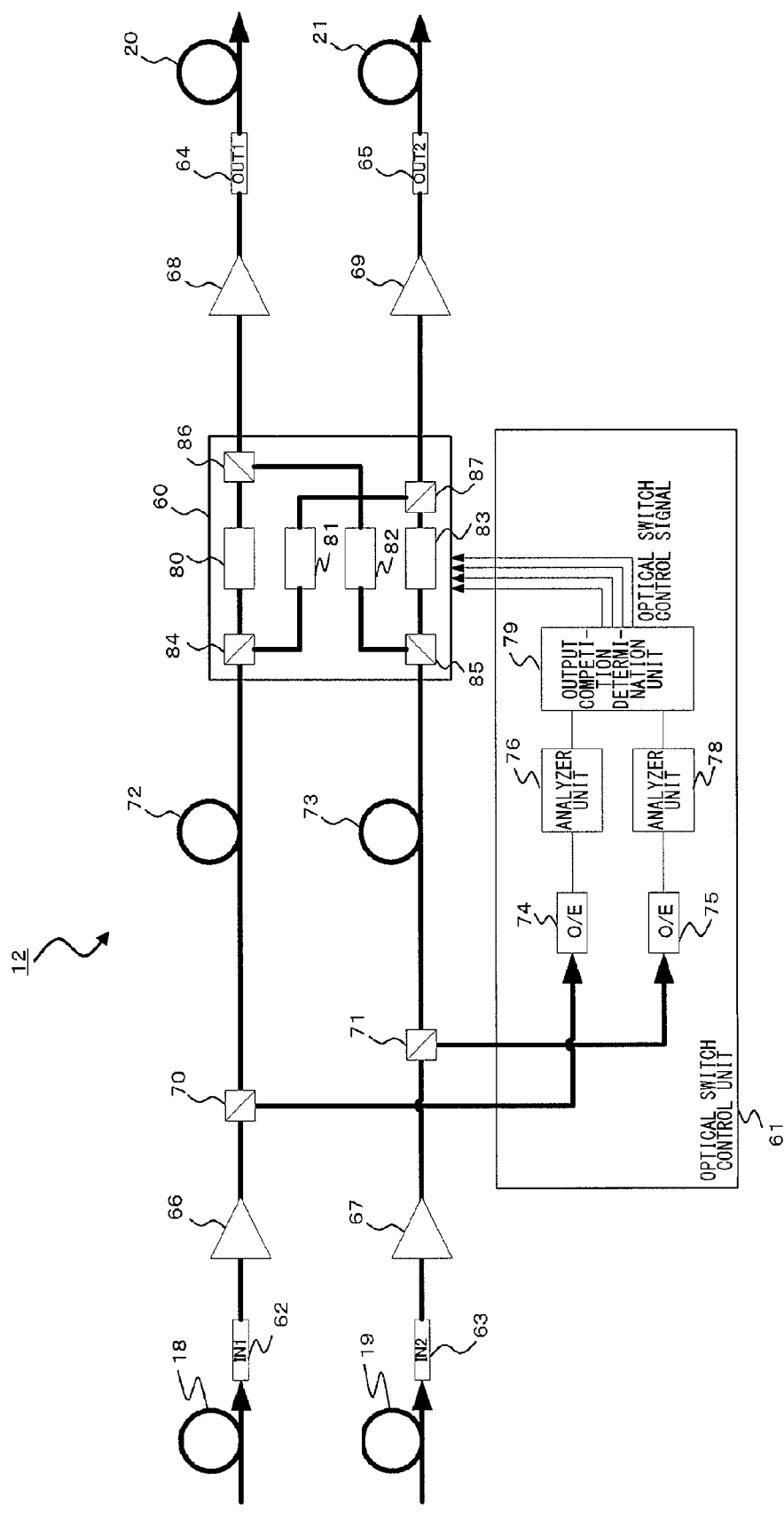
FIG. 9 shows the configuration of an optical packet switching device according to the present embodiment.

FIG. 9 shows the configuration of the optical packet switching device 12 according to the embodiment. As shown in FIG. 9, the optical packet switching device 12 comprises an optical switch unit 60, an optical switch control unit 61, a first input unit 62, a second input unit 63, a first input-side optical amplifier 66, a second input-side optical amplifier 67, a first demultiplexer 70, a second demultiplexer 71, a first optical delay line 72, a second optical delay line 73, a first output-side optical amplifier 68, a second output-side optical amplifier 69, a first output unit 64, and a second output unit 65. The optical switch control unit 61 comprises a first optical/electrical converter unit 74, a second optical/electrical converter unit 75, a first analyzer unit 76, a second analyzer unit 78, and an output competition determination unit 79.

The optical packet switching device 12 extracts the routing information header from an optical packet signal that has been input as a WDM signal from the client or the network. The optical packet switching device 12 then determines an output destination based on the routing information header and switches the output destination by the optical switch unit 60.

Wavelength-multiplexed optical packet signals are input to the first input unit 62 and the second input unit 63. The optical packet signals that are input are obtained by converting an Ether signal from a client unit of the local node or a client unit of another node in an optical packet transmitter device such as the one shown in FIG. 7.

The optical packet signals that have been input to the first input unit 62 and the second input unit 63 are amplified by the first input-side optical amplifier 66 and second input-side optical amplifier 67 for optical level adjustment. Then, only optical packet signals of header wavelengths are optically branched by the first demultiplexer 70 and the second demultiplexer 71. The branched optical packet signals of header wavelengths are input to the optical switch control unit 61. Then, the optical packet signals of the header wavelengths are converted into electrical packet signals by the first optical/electrical converter unit 74 and the second optical/electrical converter unit 75, respectively. Then, routing information headers thereof are analyzed by the first analyzer unit 76 and the second analyzer unit 78 so as to detect destination information, priority information, and packet length information. Meanwhile, wavelength-multiplexed optical packet signals passed through the first demultiplexer 70 and the second demultiplexer 71 are input to the optical switch unit 60 via the first optical delay line 72 and the second optical delay line 73.

Based on the destination information and packet length information detected by the first analyzer unit 76 and the second analyzer unit 78, the output competition determination unit 79 checks for temporal competition of the optical packet signals input to the first input unit 62 and the second input unit 63, and when competition has occurred, the output competition determination unit 79 determines whether the optical packet signals should be transmitted or discarded based on the priority information. The output competition determination unit 79 then outputs an optical switch control signal to the optical switch unit 60 based on the result of determination.

The first optical delay line 72 and the second optical delay line 73 delay the wavelength-multiplexed optical packet signals for a duration required for the optical switch control unit 61 to generate the optical switch control signal. By providing the first optical delay line 72 and the second optical delay line 73, on/off of the optical switch unit 60 can be controlled to be synchronized with the timing of arrival of the optical packet signals at the optical switch unit 60.

The optical switch unit 60 is a 2×2 optical switch and comprises first through fourth optical gate switches 80 through 83 and four optical couplers 84-87. The optical gate switches may be implemented by a semiconductor optical amplifier (SOA). The first through fourth optical gate switches 80 through 83 are controlled to be turned on or off by an optical switch control signal from the optical switch control unit 61.

FIGS. 10A-10C illustrate output competition determination in the optical packet switching device 12. FIG. 10A shows a first optical packet signal P1 input to the first input unit 62. FIG. 10B shows a second optical packet signal P2 input to the second input unit 63. FIG. 10C shows an optical packet signal output from the first output unit 64.

As shown in FIGS. 10A and 10B, the first optical packet signal P1 is first input to the first input unit 62, and the second optical packet signal P2 is then input to the second input unit 63. The optical packet signals P1 and P2 are all directed to the first output unit 64 as an output destination. The first optical packet signal P1 and the second optical packet signal P2 are optical packet signals having the same level of priority (in this case, the degree of priority is low for both).

As shown in FIGS. 10A and 10B, the first optical packet signal P1 and the second optical packet signal P2 temporally compete (in other words, there is overlap in time). This temporal competition can be determined based on the destination information and the packet length information regarding the first optical packet signal P1 and the second optical packet signal P2. In the optical packet switching device 12 according to the present embodiment, when a plurality of optical packet signals temporally compete as described above, the output competition determination unit 79 compares the degree of priority of the competing optical packet signals. When the optical packet signals have equal degree of priority, it is determined to allow the optical packet signal input first to pass and to discard the following optical packet. More specifically, in the examples shown in FIGS. 10A-10C, since the degree of priority is "low" for both first optical packet signal P1 and second optical packet signal P2 that are competing, the output competition determination unit 79 allows the first optical packet signal P1 that has been input first to pass and discards the second optical packet signal P2 that has been input subsequently. In the examples shown in FIGS. 10A-10C, an explanation is given for the case when the degree of priority of two optical packet signals is "low." However, the same applies for the case when the degree of priority is "high" for both.

FIGS. 11A-11C also illustrate output competition determination in the optical packet switching device 12. FIG. 11A shows a first optical packet signal P1 and a third optical packet signal P3 that are input to the first input unit 62. FIG. 11B shows a second optical packet signal P2 input to the second input unit 63. FIG. 11C shows an optical packet signal output from the first output unit 64.

As shown in FIGS. 11A and 11B, the first optical packet signal P1 is first input to the first input unit 62, the second optical packet signal P2 is then input to the second input unit 63, and the third optical packet signal P3 is lastly input to the first input unit 62. The first through third optical packet signals P1 through P3 are all directed to the first output unit 64 as an output destination. The first optical packet signal P1 and the third optical packet signal P3 both have a "low" degree of priority, and the second optical packet signal P2 has a "high" degree of propriety.

In the optical packet switching device 12 according to the present embodiment, when a plurality of optical packet signals temporally compete, the output competition determination unit 79 compares the degree of priority of the competing optical packet signals. When the optical packet signals have different degree of priority, the output competition determination unit 79 performs a process of allowing an optical packet having a high degree of priority to pass and discarding an optical packet having a low degree of priority.

A detailed description is now given of the above process in reference to FIGS. 11A-11C. The first optical packet signal P1 is output to the first output unit 64 since the first optical packet signal P1 has been input first. It is then assumed that the second optical packet signal P2, whose degree of priority is higher than that of the first optical packet signal P1, is input to the second input unit 63 while the first optical packet signal is being transmitted. In this case, the output competition determination unit 79 stops the transmission of the first optical packet signal P1 having a low degree of priority and allows the second optical packet signal P2 having a high degree of priority to pass. In other words, a third optical gate switch 82 of the optical switch unit 60 is turned off while the first optical packet signal P1 is being output to the first output unit 64, and a first optical gate switch 80 is then turned on. A no-signal period called predetermined "guard time" is provided between time in which the third optical gate switch 82 is turned off and time in which the first optical gate switch 80 is turned on. The guard time is for recognizing that the second optical packet signal P2 is normal data in a receiver in the subsequent stage. Then, the third optical packet signal P3 having a low degree of priority is input to the first input unit 62. The third optical packet signal P3 and the second optical packet signal P2 concur in time, and the third optical packet signal P3 is discarded since the degree of priority thereof is lower than that of the second optical packet signal P2.

In the example shown in FIGS. 11A-11C, the first optical packet signal P1 is output from the first output unit 64 while missing a part of data. The first optical packet signal P1 is input to the optical packet receiver device 13 shown in FIG. 8. In the optical packet receiver device 13, anomaly detection is performed on a received packet by the packet identification unit 54, as described above. Thus, a packet signal, such as the first optical packet signal P1, that is missing a part of data is discarded. Therefore, the optical packet receiver device 13 does not get affected even when the outputting of an optical packet signal having a low degree of priority is stopped in the middle.

As described above, the optical packet switching system 10 according to the present embodiment allows a signal with a high degree of priority to be efficiently transmitted by using priority information in output competition determination.

In the above-stated embodiment, the degree of priority is defined in two levels: "high" and "low." However, the degree of priority is not limited to these, and a plurality of levels may be set for the degree of priority. In this case, an optical packet signal with a highest degree of priority is preferentially output in output competition determination.

Described above is an explanation of the present invention based on the embodiments. These embodiments are intended to be illustrative only, and it will be obvious to those skilled in the art that various modifications to constituting elements and processes could be developed and that such modifications are also within the scope of the present invention.

What is claimed is:

1. An optical packet switching system comprising:
an optical packet transmitter device including:
a detection unit configured to detect destination information and predetermined priority information from a received client signal,
a header generation unit configured to generate a header containing the destination information and the priority information,
a header insertion unit configured to insert the header in the client signal so as to generate a packet signal, and
an electrical/optical converter unit configured to convert the generated packet signal including the inserted header into an optical packet signal and output the optical packet signal to an optical transmission path; and
an N-input×N-output optical packet switching device, wherein N is an integer equal to or greater than 2, the optical packet switching device including:
N receiver units, each configured to receive an optical packet signal from different optical transmission paths,
N branching units, each configured to branch the optical packet signal received by each of the N receiver units to N first branched optical packet signals and N second branched optical packet signals,
an N-input×N-output optical switch unit configured to route one of the first branched optical packet signals,
N analyzer units configured to analyze the header of the N second branched optical packet signals so as to detect the destination information and the priority information, and
an output competition determination unit configured to check for temporal competition of N optical packet signals input to the N receiver units based on destination information and to determine whether each of the N optical packet signals should be transmitted or discarded based on priority information when there is competition.

2. The optical packet switching system according to claim 1, wherein the output competition determination unit compares a degree of priority of competing optical packet signals when there is temporal competition in the N optical packet signals, and wherein the output competition determination unit allows an optical packet signal input first to pass and discards the following optical packet when the optical packet signals have equal degree of priority.

3. The optical packet switching system according to claim 1, wherein the output competition determination unit compares a degree of priority of competing optical packet signals when there is temporal competition in the N optical packet signals, and wherein the output competition determination unit allows an optical packet signal having a high degree of priority to pass and discards an optical packet having a low degree of priority when the optical packet signals have different degree of priority.

4. The optical packet switching system according to claim 3, wherein, when a second optical packet signal whose degree of priority is higher than that of a given first optical packet signal is input while the first optical packet signal is being transmitted, the output competition determination unit stops the transmission of the first optical packet signal and allows the second optical packet signal to pass.

5. The optical packet switching system according to claim 4 further comprising:
an optical packet receiver device configured to receive an optical packet signal output from the N-input×N-output optical packet switching device, wherein,
when the optical packet receiver device receives the optical packet signal stopped in the middle by the output competition determination unit from being transmitted, the optical receiver device discards the optical packet signal.

* * * * *